Patented Jan. 1, 1929.

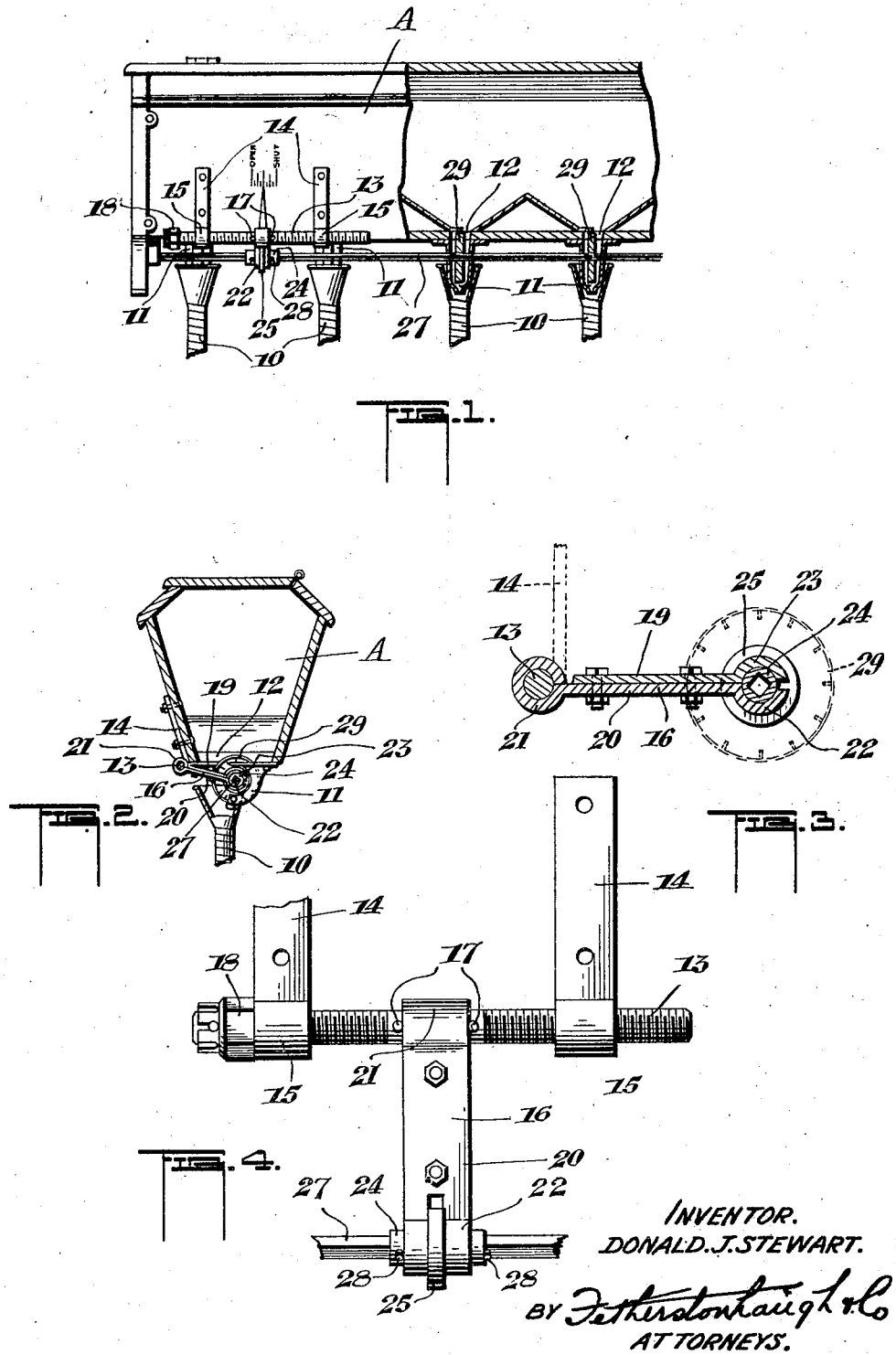

1,697,793

UNITED STATES PATENT OFFICE.

DONALD JOHN STEWART, OF SURBITON, SASKATCHEWAN, CANADA.

SEEDING MACHINE.

Application filed August 15, 1927. Serial No. 213,132.

This invention relates to improvements in seeding machines and the objects of the invention are to provide a simply constructed, durable and efficient means for controlling the quantity of seed discharged from the seed box to the seed drills when the machine is in operation.

Further objects are to provide improved and simplified means for adjusting the feed cups of an ordinary seed drilling machine.

With the foregoing and other objects hereinafter more fully referred to in view, the invention relates essentially to a seed drill feed control in which a feed rod adjustably supported from the feed hopper is connected to a plurality of closure members supported on a spindle one in each of the seed cups of the hopper so that on the threaded rod being operated in one direction the closure members are collectively moved to one side of the seed cups to permit passage therefrom of the seed and whereby on the rod being further operated the control members are returned to central position within the seed cups regulating the discharge of seed therefrom to the seed drills.

Referring now to the drawings in which like numerals of reference indicate corresponding parts in each figure Figure 1 is an elevation of a seed box partly broken away showing my improved control.

Figure 2 is a transverse section of Figure 1.

Figure 3 is a sectional detail of the closure member and its connection to the operating rod.

Figure 4 is a plan view of the adjusting rod and spindle supporting the closure members in the seed cups.

Referring now more particularly to the drawings in which a preferred example of my invention is disclosed, A designates the seed box of an ordinary seed drill of well known construction and 10 a series of feed tubes provided with seed cups 11 registering with discharge passageways 12 in the seed box.

My invention includes means for controlling the flow of seed through these passageways and consists of a horizontally extending threaded screw rod 13 suspended from the outside of the seed box A by brackets 14 formed at their lower ends with threaded eyes 15. Loosely mounted on the stem 13 intermediate of the brackets and on an unthreaded portion is the arm 16 retained in position on the unthreaded portion of the stem by pins 17 extending therethrough. A nut 18 is also provided on the end of the screw rod and locked there by means of a cotter pin so that on the nut being turned the stem 13 is turned. The arm 16, previously referred to, is formed of two pieces of metal, as illustrated in Figure 3 and designated by the numerals 19 and 20, one of which 20, is formed with a loop 21 at one end and a semi-circular portion 22 at the opposite end, the other piece 19 being formed with one semi-circular end portion 23.

Rotatably mounted within the semi-circular portions 22 and 23 is a sleeve 24 formed centrally with a collar 25. Extending through the sleeve 24 is a square shaped feed rod 27 to which the member 16 is secured by means of pins 28. The feed rod 27 is provided at spaced intervals with control members which are also secured thereto and which are adapted according to movement to regulate the flow of seed through the passageways 12.

From the foregoing it will be seen that upon the nut 18 being turned, the rod 13 is rotated thus moving from right to left or vice versa and carrying with it the member 16 which being secured to the shaft 27 will cause it to move to close or open the passageways 12 through the closure members 29, mounted thereon.

To open a seed cup a wrench or the like may be employed on one end of the stem 13 and on being turned to the right will rotate it in the brackets 14. The arm 16 moves forward with the stem drawing the feed rod 27 along with it and causing the closure member 29 to contact with one side of the passageway 12 opening the way to the seed cups. The passageways 12 remain open until the stem 13 is again rotated.

One set such as described operates only one half of a seed drill, a similar set being necessary for the other half of the drill.

My improved device may be attached to any ordinary seed drill, a slight change being made to suit the collar and feed rod of different makes of drills. This does not, however, interfere with the general principles of construction.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. In a seeding machine, the combination with a plurality of cup members, of a transversely extending feed rod associated with said members, spaced discs on said rod, an intermittently threaded screw rod parallel with the feed rod, means for operating said rod, a bent arm engaging an unthreaded portion of the screw rod at one end and engaging the feed rod at the other end, retaining means for the arm whereby, on the screw rod being operated, the arm is moved laterally therewith to move the feed rod laterally and the disc members thereon backwardly and forwardly in the seed cups to control the flow of seed therethrough.

2. The invention according to claim 1 in which the means for operating the screw rod to adjust the feed rod and the discs thereon include an operating nut and cotter pin means for retaining said nut on the screw rod.

3. The invention according to claim 1 in which the screw rod is operatively suspended in brackets in turn rigidly secured to the seed box.

4. The invention according to claim 1 characterized by the fact that the retaining means for the arm connecting the screw rod with the feed rod and supporting the latter comprise spaced pins on the unthreaded portion of the screw rod and spaced pins on a sleeve rigidly mounted on the feed rod.

5. In a device of the character described, the combination with seed cups, of a suspended transversely extending screw rod with unthreaded spaced portions, and a feed rod provided with discs registering with the seed cups, a sleeve with spaced retaining means for the feed rod, spaced retaining means in the unthreaded portion of the screw rod, an arm provided with an indicator loosely mounted at each end between said retaining means on the screw rod and on the feed rod, and means for operating the screw rod whereby a lateral movement backwardly and forwardly through the aforementioned arm is imparted to the feed rod.

In witness whereof I have hereunto set my hand.

DONALD JOHN STEWART.